Aug. 16, 1966   F. P. LUCKMAN, JR   3,266,642
SEQUENTIAL ELEMENT DISPENSING APPARATUS
Filed Jan. 28, 1964   5 Sheets-Sheet 1

INVENTOR.
FRANKLIN P. LUCKMAN, JR
BY Thomas M. Ferrill, Jr.
ATTORNEY

Aug. 16, 1966   F. P. LUCKMAN, JR   3,266,642
SEQUENTIAL ELEMENT DISPENSING APPARATUS
Filed Jan. 28, 1964   5 Sheets-Sheet 2

INVENTOR.
FRANKLIN P. LUCKMAN, JR.
BY Thomas M. Ferrill, Jr.
ATTORNEY

Aug. 16, 1966  F. P. LUCKMAN, JR  3,266,642
SEQUENTIAL ELEMENT DISPENSING APPARATUS
Filed Jan. 28, 1964  5 Sheets-Sheet 3

INVENTOR.
FRANKLIN P. LUCKMAN, JR.
BY Thomas M. Ferrill, Jr.
ATTORNEY

Aug. 16, 1966    F. P. LUCKMAN, JR    3,266,642
SEQUENTIAL ELEMENT DISPENSING APPARATUS
Filed Jan. 28, 1964    5 Sheets-Sheet 4
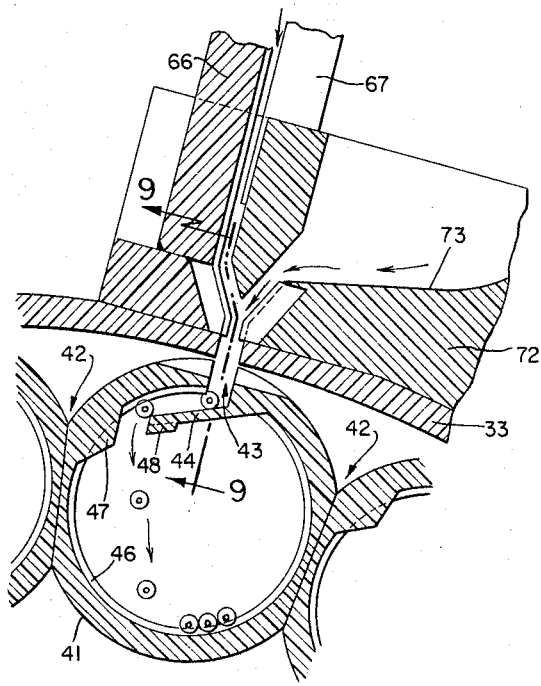
Fig. 8
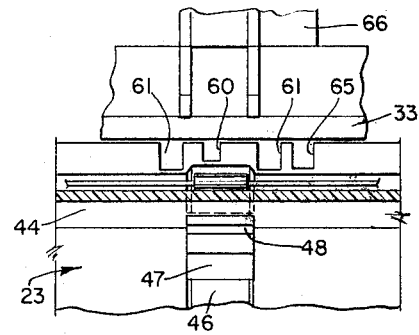
Fig. 9
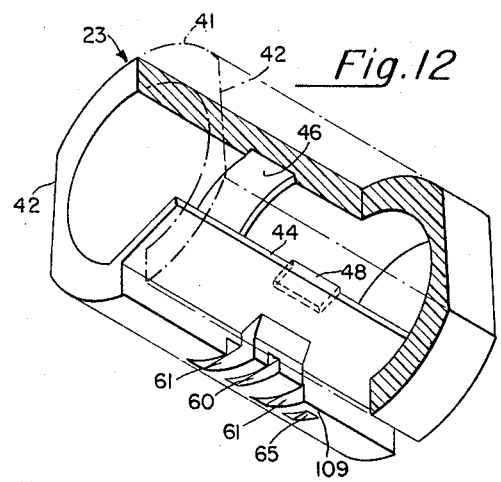
Fig. 12
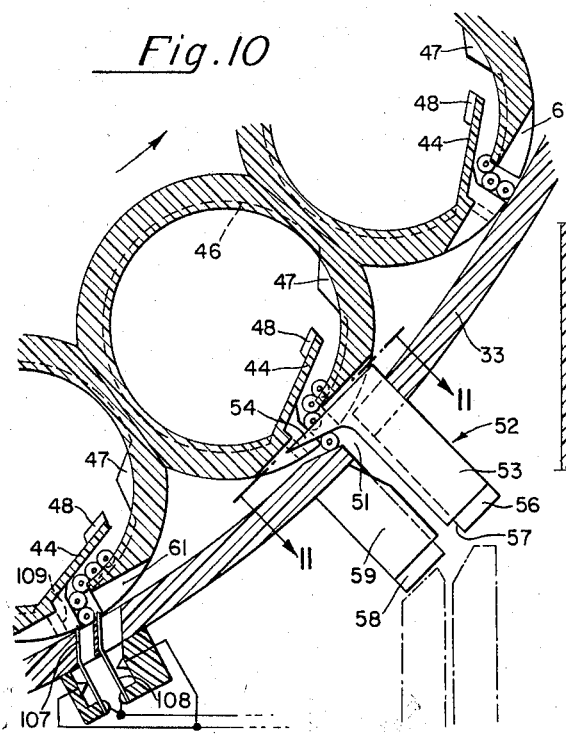
Fig. 10
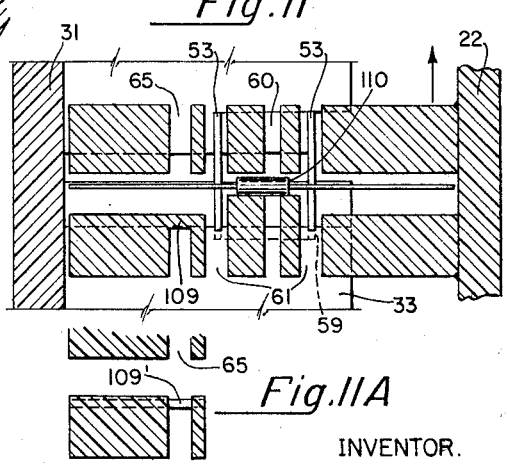
Fig. 11
Fig. 11A
INVENTOR.
FRANKLIN P. LUCKMAN, JR.
BY Thomas M. Ferrill Jr.
ATTORNEY

United States Patent Office 3,266,642
Patented August 16, 1966

3,266,642
SEQUENTIAL ELEMENT DISPENSING
APPARATUS
Franklin P. Luckman, Jr., 1905 Acorn Lane,
Abington, Pa.
Filed Jan. 28, 1964, Ser. No. 340,662
19 Claims. (Cl. 214—16)

The present invention relates to the receiving and containing of distinguishable quantities of elements, and the feeding out of said elements according to predetermined sequence patterns. One example of the use of the present invention is for the sequential dispensing of electric circuit components.

In assembly lines for manual insertion of electronic components in the production of very large quantities of a given type of electrical apparatus, it is common practice to have one operator at a first station insert in each panel or chassis only a single circuit element, for example a 4700 ohm, ½ watt resistor, in a single circuit position therein. The next operator along the line may likewise insert only one component, for example, a 1 megohm resistor in another predetermined circuit position, as each panel or chassis arrives at his station.

In many automated assembly lines, pre-punched printed circuit panels are moved in a series along a track, each panel progressing to a station at a first mechanical component insertion head where a first component (for example a 4700-ohm resistor) is fed down and inserted in the predetermined position therefor, the panel then being moved to the second station where the second component insertion machine inserts a second component (e.g. a 1-megohm resistor) in the predetermined position therefor, and the panel moves on to further insertion heads to receive the further components.

The present invention is a system which facilitates a different procedure, wherein a single person or single mechanical insertion device inserts several components in each apparatus unit before it moves on and is replaced by the next apparatus unit to come to the station. According to this procedure, one inserter (human or mechanical) may be employed to insert in each apparatus unit, upon its arrival, several different components, for example, a 4700-ohm resistor in a first circuit position, a 1-megohm resistor in a second circuit position, a miniature tubular capacitor of predetermined value in a third circuit position, and further circuit elements in the predetermined circuit positions therefor, the apparatus unit thereafter being moved on from this station and replaced by another apparatus unit which will receive a similar set of components, inserted in their respective positions in the same sequence. Such assembly procedure is especially efficient where space limitations or small quantity production runs are involved.

An object of the present invention is to provide efficient and convenient sequential dispensing apparatus.

A further object is to provide apparatus for dispensing a variety of elements in predetermined recurrent sequences.

A further object is to provide apparatus for feeding into a magazine or insertion machine or other receiving means, in a predetermined recurrent sequence, elements closely related to each other in physical form but having specifically different properties, characteristics, or values.

In accordance with the present invention, apparatus is provided for receiving in respective compartments a first quantity of elements, for example, resistors or other electrical components of a first value, a quantity of elements different from the elements of said first quantity, and further quantities of elements, and feeding these elements out in a predetermined sequence. If the elements are to be electric circuit components, for example, the present invention feeds them out according to the order in which they are to be inserted at a station. In a preferred embodiment, the invention comprises a multi-chambered cylinder driven in rotation for discharge of elements in a predetermined sequence. A first chamber is loaded with a quantity of elements of a value to be provided in a first circuit position, a second chamber is loaded with a quantity of elements of a value to be used in a second circuit position, and so forth. As each chamber in turn passes by a discharge port, it is caused to discharge only one of its elements. In this manner, the cylinder during each revolution (or in some instances during a fraction of a revolution, e.g. one-half or one-third of a revolution) discharges a predetermined sequence of elements conformal to a program of utilization of the elements, which in the case of electric circuit components, may be a program of insertions of the components of different types or values.

Chute means preferably are provided for efficiently loading the individual chambers with quantities of elements of predetermined values. Means also are arranged to receive the elements in sequence as fed out from the cylinder. The last-named means may comprise a standing magazine with gradually retracted support column, or may take the form of a belt, tape or corrugated strip or trays, or any machine arranged to receive elements in sequence.

The above and other features will be rendered more fully apparent from the detailed description of the invention, in reference to the appended drawings. These drawings are described briefly below:

Figure 14:
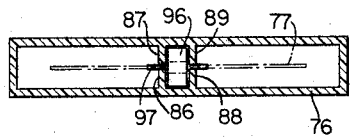
Figure 1:
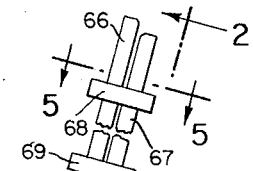
FIG. 1 is a front elevation, partly in section, of element dispenser apparatus in accordance with the present invention.
Figure 13:
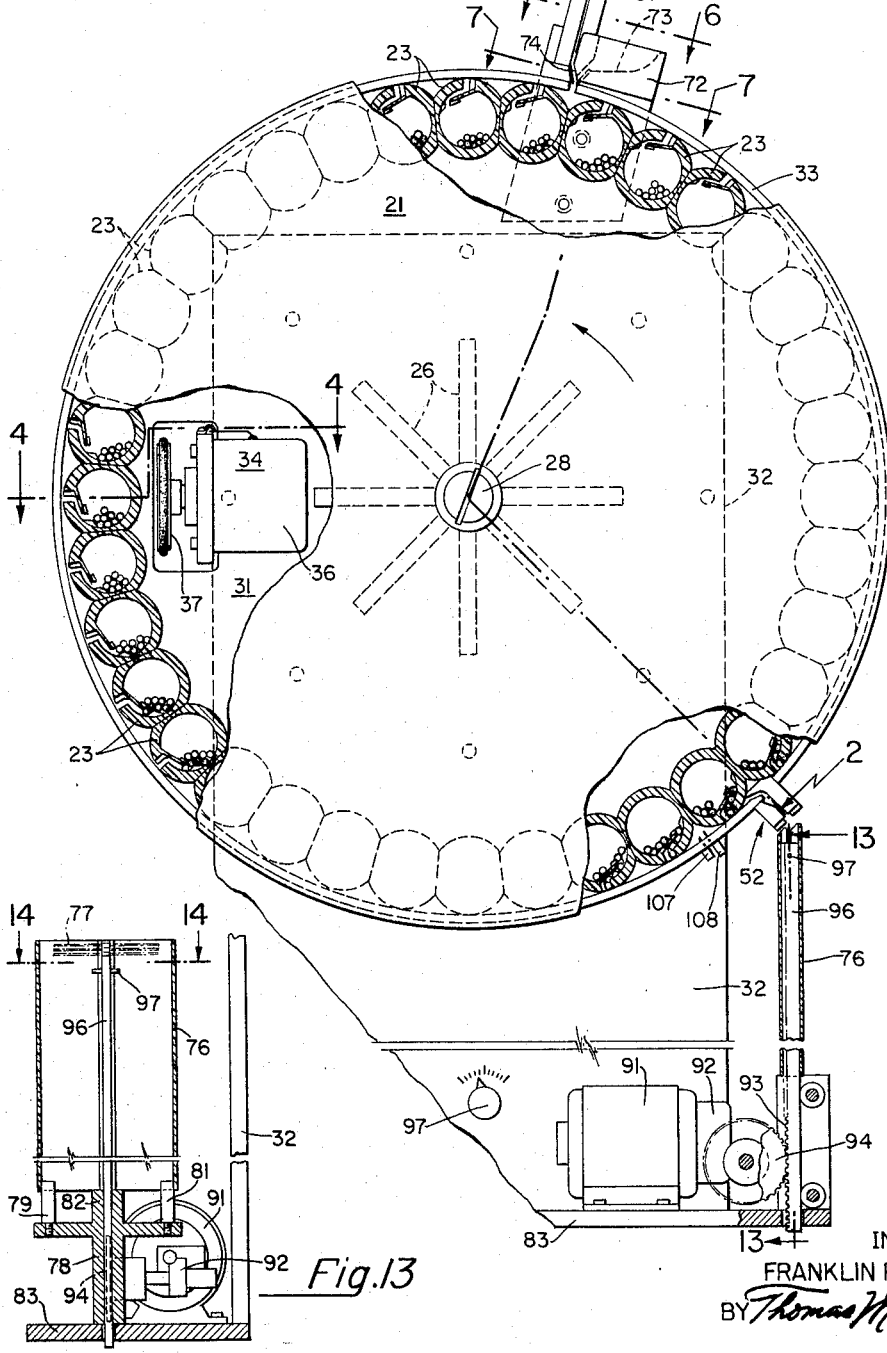
Figures 5, 6:
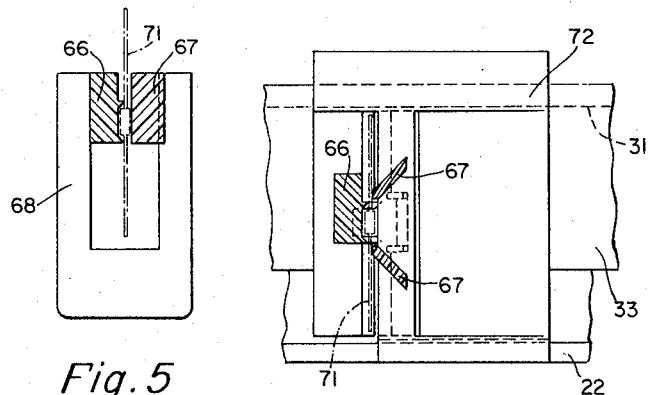
Figure 7:
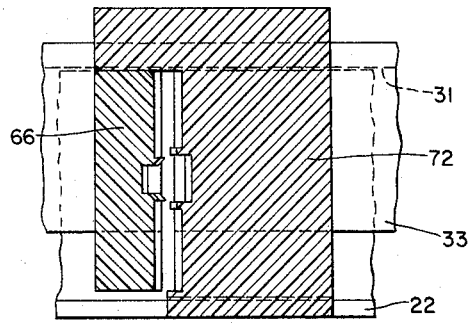
Figure 2:
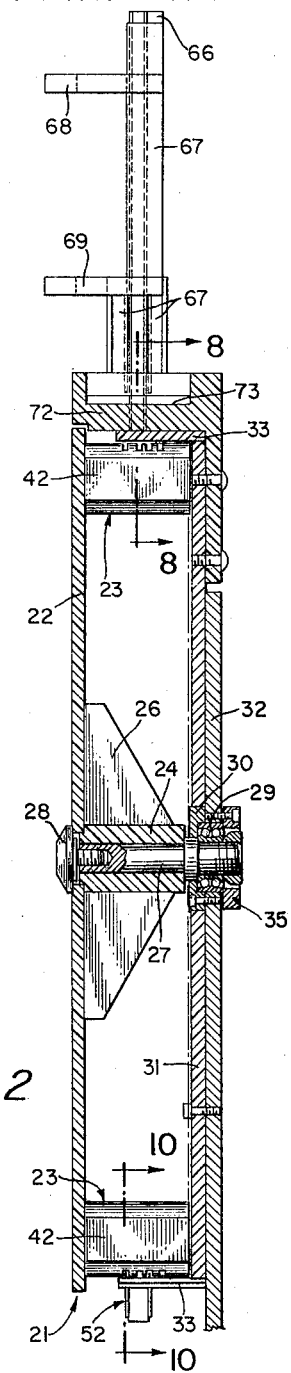
FIG. 2 is a sectional view taken on line 2—2 in FIG. 1.
Figure 15:
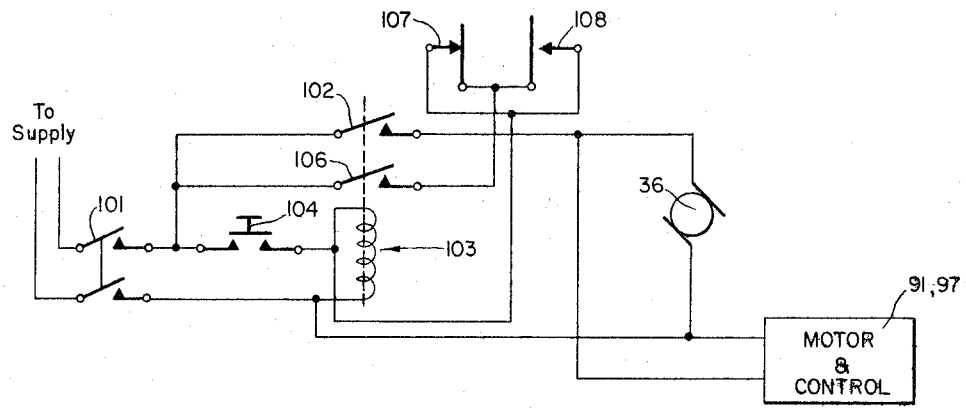
Figure 16:
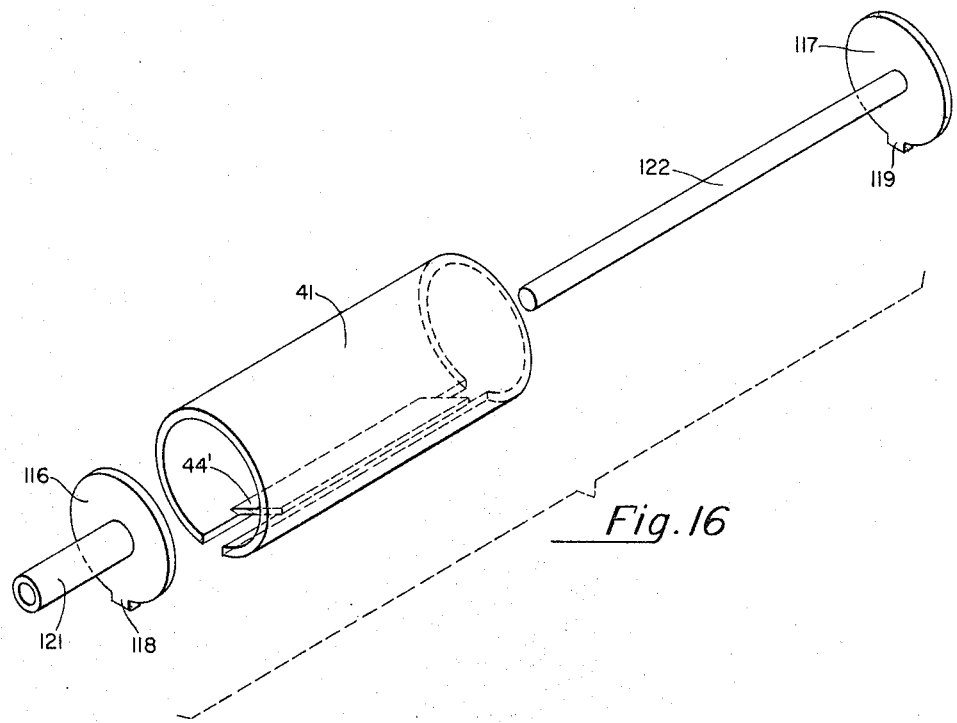

FIGS. 5 and 6 are cross-sectional views of the cylinder loading injector taken on lines 5—5 and 6—6, respectively, of FIG. 1;

FIG. 7 is a cross-sectional view through the injector feed throat, taken on line 7—7 in FIG. 1;

FIG. 8 is an enlarged partial cross-sectional view taken on line 8—8 in FIG. 2, showing details of an element chamber positioned to be loaded;

FIG. 9 is a partial sectional view taken on line 9—9 in FIG. 8;

FIG. 10 is an enlarged partial cross-sectional view taken on line 10—10 in FIG. 2;

FIG. 11 is a view, partly in section, taken on line 11—11 in FIG. 10 and showing details of the element interception action;

FIG. 11-A is a partial sectional view of a modification of the structure of FIG. 11;

FIG. 12 is a perspective view, partly in section, of the details of one of the chambers of the cylinder;

FIG. 13 is a sectional view of the chute loading mechanism taken on line 13—13 in FIG. 1;

FIG. 14 is a cross-sectional view of the chute or magazine shown in FIGS. 1 and 13, taken on line 14—14 in FIG. 13;

FIG. 15 is a circuit diagram of the cylinder drive motor, relay, and operating switches; and FIG. 16 is an exploded drawing of an optional chamber construction for adjustable length of the chambers.

Referring now principally to FIGS. 1 and 2, there is provided a rotatable cylinder or rotor 21 including a disc 22 and a plurality of substantially cylindrical chambers 23 in its periphery. The rotor 21 also includes a hub 24 fixed to disc 22, and preferably includes radially disposed gussets or webs 26 for rigidity of the disc 22 and hub 24.

The hub 24 is arranged to be secured to a shaft 27 as by a screw 28. The shaft 27 is supported for rotation by a double-race bearing 29 which fixes the axis of rotation of the rotor 21. Bearing 29 is housed and mechanically supported in a housing 30 in upright mounting plate 32 and clamped axially by a ring 35. The shell 31 is piloted by housing 30 and includes a fixed disc portion and a cylindrical shell portion 33, the latter portion of the shell serving as a constraining boundary with respect to the elements to be dispensed from the chambers 23. Motor drive means 34 are provided for causing the cylinder 21 to rotate in a counterclockwise direction, as viewed in FIG. 1. This motor drive means comprises a motor 36 mounted on the shell 31 and provided with internal reduction gearing and a friction drive wheel 37. This friction drive wheel 37 engages the disc portion 22 of cylinder 21, causing the cylinder to rotate at a slow speed, for example, 3 to 20 r.p.m.

Figure 4:
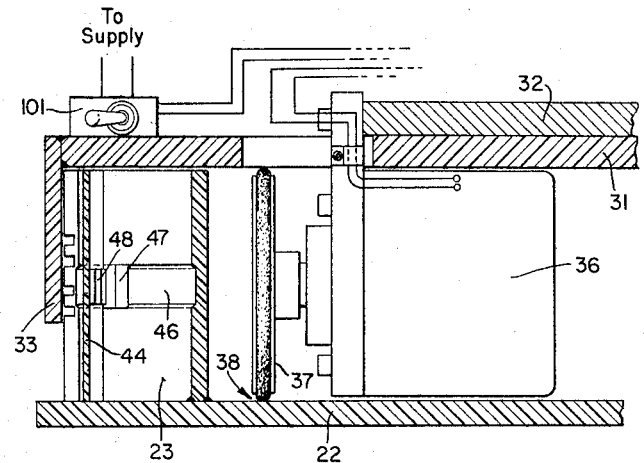
FIG. 4 is a partial sectional view showing the friction drive motor of the apparatus of FIG. 1.

The arrangement of the motor drive is shown in detail in FIG. 4. As shown in this view, the friction drive wheel 37 engages the disc 22 of rotor 21 at 38.

Figure 3:
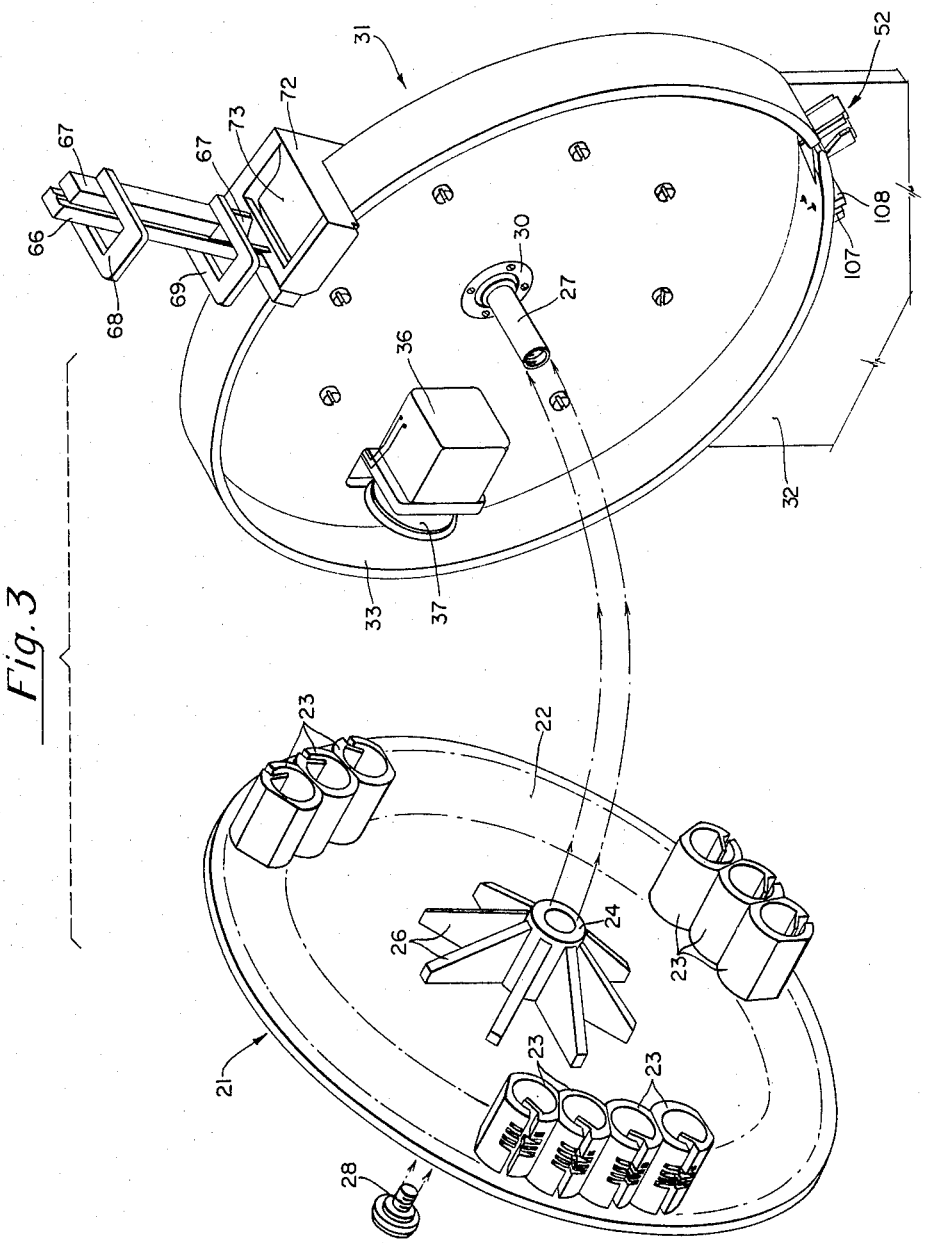
FIG. 3 is an exploded view of the apparatus of FIGS. 1 and 2, showing the cylinder, drive motor, shell and loader.

The relationship between the cylinder 21, and the shell 31 supported on the upright support member 32 is shown more clearly in the exploded view in FIG. 3.

The arrangement of the chambers 23 is shown in the cross-sectional portions in FIG. 1 and is shown in greater detail in FIGS. 8, 10 and 12. These chambers may each comprise a hollow cylinder 41 which may, for compactness, have flats 42 cut in its opposite exterior walls in planes which are radially disposed with respect to the rotor axis, the latter being coincident with the axis of shaft 27 (FIG. 2). Each chamber has a port 43 through which to discharge a single element as the chamber passes by an exit passage. Preferably, arrangements are also made for loading each chamber through the same port.

A baffle plate 44 is provided in each chamber 41, cooperating with the internal wall thereof to provide a substantially tangential path between the port and the main interior region of the chamber.

Where the elements to be dispensed are electrical components (such for example as resistors) each having a cylindrical body and a pair of lead wires extending substantially axially in opposite directions from the body, each chamber is preferably provided with an undercut portion 46 as seen most clearly in FIG. 12, for accommodating the radial projection of said cylindrical bodies beyond the element lead wires, the axial extent of the undercut or groove 46 being slightly greater than the axial extent of the cylindrical bodies of the elements, for clearance and tolerance of the electrical component body lengths.

It has been found that the action in each chamber of electrical elements of the aforedescribed types having cylindrical bodies and axial lead wires extending in opposite directions therefrom is enhanced by including a semi-pyramidal projecting portion 47 in each chamber and by providing on each baffle 44 a projecting portion 48, the axial extent and positioning of these projecting portions 47 and 48 corresponding approximately to those of the cylindrical bodies of the elements.

The shell 32 and the cylinder 21 may, if desired, be constructed of plastic material, preferably a transparent plastic such as acrylic. If so constructed, the operator is enabled to check the performance of the system and the diminution of the chamber loads visually.

As shown most clearly in FIGS. 1 and 10, the cylindrical portion 33 of the shell 31 is provided with at least one exit passage 51 through which to permit the egress of the elements to be dispensed. This exit passage is positioned in a region intermediate between the lowest point of travel of the chambers and their rise to the height of the axis about which the cylinder rotates. Interceptor means 52 are attached to the shell at said exit passage, for intercepting and deflecting outward a single element and for restraining the remaining elements from passing out of the chamber, as a chamber moves over the exit passage. The interceptor comprises a pair of spaced plates 53 each having a projecting tapered portion 54 so positioned as to have it point above the axial lead wire of the lowermost element (i.e. an element immediately adjacent the cylindrical wall 33) but below the lead wire of the element next above in the port of a chamber. Cooperating with the pair of spaced pick-off plates 53 is a body portion 56 which serves not only to space plates 53 apart by a distance slightly greater than the maximum axial extent of the element bodies but also to provide an upper boundary wall 57 for the cylindrical bodies of the elements as they descend. Further cooperating guide means include a second body 58 and flange plates 59 for cooperating with plates 53 and body 56 to define the downwardly outward path for the dispensed elements.

Suitable undercuts are provided in the outermost portions of the chambers 23 for clearing the inward projection of the interceptor plates 53. These undercuts 61 are seen most clearly at 61 in FIGS. 10 and 12. An additional cut 60 is provided through which to permit a sensitive switch actuator to engage the outermost element to sense its presence in position to be dispensed, and a cut 65 with a lug portion 109 is provided for actuation of a further switch which cooperates with the element-actuated switch, as will be described hereafter.

As seen at the top of FIGS. 1 and 2 and in FIGS. 5, 6 and 7, chamber loading means are provided adjacent the top of the shell 31, 33 for injection of a quantity of elements of a given value into a subjacent chamber, through its port. Said loading means, in a preferred embodiment, is a gravity feed injector comprising rails 66 and 67 held in spaced relation to each other by U-shaped brackets 68, 69 (see especially FIGS. 1 and 5) for free passage of horizontally disposed elements as shown in FIG. 5. Above bracket 69, guide rails 66 and 67 have the configuration shown in cross-section in FIG. 5, arranged to guide downward elements such as electrical component 71 (FIG. 5) by their cylindrical bodies, the axially extending leads projecting freely outward. Below bracket 69, as shown in FIG. 6, the rails 66, 67 are so shaped as to guide the elements primarily by their axially extending lead wires, the rails being widely spaced from the cylindrical body surface of the elements.

The rails 66 and 67 terminate at their lower end in a part 72 which includes a manual loading hopper 73 and a throat 74 into which element passages from the manual loading hopper 73 and the guide rails 66, 67 converge. The guide rails 66 and 67 are so arranged as to receive resistors, for example, supplied in a "grip strip" such as that available from International Resistance Company, or in a body tape. The end of a complete "grip strip" or body tape is fed in at the top between rails 66 and 67, bringing its line of resistors downward. In the region below bracket 69, the opening provided between the lead-confining spaced portions of guide rail 67 provides space through which to pull the end of the paper retainer strip or tape away from the resistors, releasing them as they proceed downward between the rails, to the throat 74.

Alternatively, the injector comprising rails 66, 67 may be loaded by inserting at the top a series of resistors held in alignment by their leads inserted in a corrugated board known as a card pack, the bodies of the resistors again being passed down between the rails, by means of the corrugated board. The corrugated board is passed downward adjacent the rails on the sides thereof opposite the direction of projection of brackets 68 and 69. When the resistors are all between the rails 66 and 67, the corrugated board is removed by being manually retracted rearwardly, releasing the resistors which then fall downward through throat 74 into the subjacent chamber.

For manual loading of resistors not supplied in "grip strip" or card pack or body tape, the resistors may be hand fed from bulk hopper portion 73 of the receiving unit 72, being thereby permitted to pass downwardly through the convergent passage therefrom into throat 74.

If manual loading of hopper 73 is not to be used, the passage from hopper 73 preferably filled up, limiting the throat 74 to feed only from the passage defined at the bottom of rails 66, 67.

One form which may be taken by the means for receiving elements from cylinder 21 through unit 52 is illustrated in FIGS. 1, 13 and 14. A convenient device for receiving the sequence elements from cylinder 21 is a box magazine or chute 76 having a cross-section as illustrated in FIG. 14, and capable of holding a considerable number of elements such as electric circuit components (e.g., resistors) in a row, as represented at 77 in FIGS. 13 and 14.

Referring now to FIGS. 1 and 13, magazine 76 is supported upon a standard 78 having two upright support elements 79 and 81 and a central support portion 82 for holding the magazine 76 thereon, the magazine preferably being held vertical. The standard 78 and base 83 preferably are fixed to the mounting plate 32. As is shown in FIG. 14, the magazine 76 includes mutually opposed, inwardly extending ribs or flanges 86, 87 and 88, 89, for confining and guiding elements such as electric circuit components 77 in a row with their cylindrical bodies constrained at one end by ribs 86 and 87 and at the opposite end by ribs 88 and 89. The leftwardly extending lead wires are permitted to extend between ribs 86 and 87, and the rightwardly extending lead wires extend between flat ribs 88 and 89. Sufficient clearance is provided for the diameter and tolerance of the lead wires, and for the tolerance variations of length of the cylindrical bodies.

If the magazine 76 were merely fixed below the interceptor means 52 for acceptance of elements falling therefrom, some of the elements could be expected to become tilted in their long downward passage into magazine 76 and jam it. To overcome this action, a motor 91 with reduction gearing 92 terminating in a rack and pinion drive 93, 94 is used to carry out gradual downward retraction of a column 96 having a guide pin 97 extending through the slits formed between ribs 86 and 87 and between ribs 88 and 89. The top of column 96 initially provides a relatively high horizontal platform on which the elements come to rest just after entering the upper end of the magazine 76, before they have fallen far enough to become appreciably tilted. As the cylinder 21 rotates, and elements are fed out through the exit passage and interceptor means 52, these elements form a row in magazine 76 of increasing length. The column 96 is retracted, i.e., driven downward, at approximately the same rate as the length of the row of elements in magazine 76 increases, whereby the distance through which the elements fall upon entering the magazine 76 is kept relatively short. If motor 36 is a synchronous motor driven from an alternating current source, motor 91 may be a variable speed motor, provided with a speed control 97 in a well-known manner.

When a magazine 76 is fully loaded, the supply of power to motors 36 and 91 is interrupted by a supply line switch, and the magazine 76 is removed and replaced by an empty magazine. Pinion 94 is coupled to its drive shaft by a back stopping clutch, so that the column 96 having the rack face 93 engaging pinion 94 may be pushed up into the empty magazine, to take its initial position with a very short distance for fall of the elements in the magazine.

Either or both the loading chute and the magazine may be constructed of transparent plastic.

If the dispenser system is to feed its output directly into a machine for inserting components into circuit apparatus such for example as printed circuit panels, a zigzag chute often referred to as a riffle may be employed between the output passage of interceptor means 52 and such component insertion machine.

FIG. 15 is a circuit diagram showing one circuit configuration which may be provided for the control of cylinder drive motor 36 and magazine load motor and control 91, 97. The supply circuit for the motors extends through a double-pole switch 101, and through one armature switch element 102 of a double-pole single-throw relay 103. This relay is arranged to be actuated by a switch 104 of the momentary contact type. Switch 104 energizes the relay coil long enough to cause the armature switches 102 and 106 to close. Armature switch element 106 then establishes a holding circuit for retaining the relay energized through switch 107. Switch 107 is normally closed, and switch 108 is normally open. These switches are arranged as shown in FIGS. 1 and 10, for detecting the absence of an element in the port of a chamber, in position to be intercepted and passed out through interceptor 52. Each chamber which is in use is provided with a downwardly projecting lug 109 (see FIGS. 10, 11 and 12) arranged at a suitable depth behind the face of cylinder 21 for engaging the arm of switch 107, to open said switch momentarily as the chamber passes by. These lugs, if desired, may comprise removable pins 109' as shown in FIG. 11A, for convenient insertion and removal. Switch 108 is positioned at a different depth from the face of cylinder 21 (FIG. 10 for clarity of illustration treats switches 107 and 108 as coplanar), and has its sensitive arm or probe arranged to project into slot 60 and to be deflected by the outermost element which is rubbing against the cylindrical portion 33 of shell 32. So long as each chamber having a lug 109 (or 109') is supplied with a resistor in a position to be intercepted, such a resistor will close switch 108 before switch 107 is opened by lug 109 (or 109'), and retain switch 108 closed until switch 107 has re-closed. Thus, these two switches 107 and 108, being connected in parallel, retain relay 103 energized through its holding circuit. Upon the arrival at switches 107 and 108 of an exhausted chamber having a lug 109 in position to engage switch 107, the holding circuit will momentarily be opened by the actuation of normally-closed switch 107, shutting of motors 36 and 91 until the chambers are reloaded and switch 104 actuated to reset the relay 103.

The cylinder shown in FIG. 1 is shown provided with 36 ported chambers or cavities. With such a factorable number of chambers, great flexibility for loading is provided. For example, if each sequence is to comprise at least 19 elements but no more than 36 elements (for example electric circuit components each having a cylindrical body and pair of axially extending lead wires) a single sequence of such elements can be dispensed with each revolution of the cylinder 21. If the sequence is to comprise 36 elements, all of the chambers of the cylinder illustrated in FIG. 1 would be loaded, one cylinder at a time, by bringing the cylinder 21 to a position of registry between the port of one chamber and the throat 74 of the injector unit, followed by feeding in a substantial quantity of elements. The elements may be made to fill most of the space within the chamber. After loading one chamber, this procedure is repeated by moving the cylinder 21 to a position for registry of another chamber with the throat 74, the elements of the appropriate type for that chamber then being fed in.

If the number of elements per sequence is to be at least 13 but not greater than 18, such a sequence may be provided by suitably loading chambers situated within a semi-circular sector of the cylinder 21, and a similar sequence may be provided within the opposite semi-circular sector thereof. In this case, the cylinder 21 dispenses two similar sequences of elements per revolution. In like manner, for sequences of 10 to 12 elements, the chambers within a 120° sector of the cylinder 21 may be loaded for one sequence of elements, and the chambers in each of the other two sectors of 120° each may be similarly loaded, whereby the unit is made to dispense three sequences of elements per revolution. If one sequence is to comprise 8 or 9 elements, four sequences may be dispensed per revolution. If one sequence is to comprise 7 elements, 5 sequences may be dispensed per revolution, one chamber being left unloaded. The lug 109 of said chamber should be removed. If each sequence is to comprise 6 elements, in similar manner, six 6-element sequences may be dispensed per revolution of the cylinder; seven 5-element sequences may be dispensed per revolution, eight 4-element sequences may be dispensed, or twelve 3-element sequences may be dispensed per revolution.

The shifting of elements within the chambers under the influence of gravity and the element feed-out action are illustrated by the several chambers shown in section in FIG. 1. Those chambers substantially at the top of the cylinder 21 have their elements lying in the region nearest to the axis of the cylinder 21. Elements which had been in or adjacent to the ports of these chambers have dropped back under the influence of gravity. Considering now the chambers shown at the left-hand part of FIG. 1, the elements in the chambers at approximately the same height as the axis of the cylinder 21 are banked up against the inward projection 47. In those chambers slightly lower, some resistors have overcome the resistance presented by said projection 47, and proceeded into the space between said projection and the baffle 44. When a chamber has moved on down to the bottom of its course, a series of elements lies under the baffle 44, with at least one element lying in the port and rubbing lightly against the concave inner surface of the cylindrical portion 33 of shell 32. This is the element which is ready to be intercepted by the plates 53 of interceptor or pick-off means 52. As a chamber containing such an element reaches the pointed ends of the plates 53, these pointed ends project between the lead wires of said element and the lead wires of the next element immediately above, deflecting the outermost element outward and separating it from the next inner element, the latter being retained out of contact with the element which is guided out through the exit passage, and caused to remain in the chamber. The element 110 being so retained is visible in FIG. 11, held up by its substantially axial leads on the upper edges of plates 53, at the same time as the element being intercepted (not visible because it is directly beneath element 110) is being deflected outward by the lower edges of the plates 53.

In some applications, the dispenser apparatus may be required to be adapted for dispensing elements of different physical sizes. For example, where it is used for dispensing electric circuit elements such as resistors and capacitors, it may be desirable to have it adapted for handling units of different overall lengths. Referring to FIG. 16, some or all of the chambers 41 may if desired be arranged with baffle plates 44' substantially shorter than the chamber overall length. Front and rear adjustable end plates 116 and 117 may be arranged having downwardly projecting lug portions 118 and 119 to project into the chamber port. End plate 116 is provided with a tubular sleeve 121, and end plate 117 is provided with a shaft 122 slidable within sleeve 121. In use, the rear plate 117 is placed in the rear end of chamber 41, with shaft 122 projecting along the axis, out through the front of said chamber. The front plate assembly 116, 121 is slipped over shaft 122 and inserted within the front end of chamber 41. Shaft 122 is sufficiently long to project all the way through sleeve 121 and beyond, so that the front end of shaft 122 and the sleeve 121 may each be gripped and moved by hand, from the front, for positioning both plates 116 and 117.

Where the adjustable-length chambers are to be used, the disc 22 of cylinder 21 is provided with bores aligned with the axes of the chambers, and of diameter for receiving the outside diameter of sleeve 121. Locking means such as a set screw directed radially inward from the periphery of disc 22 toward its center may then be arranged to engage each tubular sleeve 121, so that after shaft 122 and sleeve 121 have been positioned as desired for a predetermined length of elements to be dispensed, the set screw may be driven inward to engage sleeve 121, clamp it in fixed position, and deform it slightly, causing it to clamp shaft 122 in fixed position.

Many variations may be made from the dispensing structure as illustrated. For example, plural injectors can be arranged, spaced at angular intervals corresponding to the angular interval between two chambers, or an integral multiple thereof, to admit of loading a plurality of chambers with the cylinder in one position. Also, a plurality of interceptors may be arranged in the lower part of the shell, beyond the lowest point of travel of the chambers, whereby each interceptor diverts a sequential series of elements, each chamber thereby yielding two or more elements per revolution of the cylinder. Furthermore, if desired, the pick-off blades of the interceptor means may in a special purpose embodiment be made to intercept and divert two elements from each loaded chamber. In addition, while the chambers have been illustrated as having their interiors of right circular cylindrical form, they may take other internal configurations, for example, polygonal forms.

As many changes may be made and many widely different embodiments may be constructed without departing from the spirit of the present invention, the accompanying drawings and description are intended not by way of limitation but rather illustration of one form which may be taken by the invention, the scope of the invention being indicated by the claims.

What is claimed is:

1. Element dispenser apparatus comprising a rotatable cylinder having a plurality of chambers, means for rotating said cylinder about an axis having a substantial horizontal component, fixed shell means establishing a boundary around and adjacent to said cylinder at least for substantially the lower half thereof, said shell means presenting a concave surface in a substantially cylindrical locus adjacent at least the lower chambers of said cylinder during its revolution, said cylinder having a port in each of said chambers for permitting a series of elements to proceed outward toward said fixed shell means, said shell means having an exit passage and interceptor for selectively intercepting and diverting into said exit passage one of the elements from a chamber at each revolution of said cylinder, motor-operated means for receiving the elements from said exit passage in sequence according to the sequence of interception of elements from the chambers during rotation of the cylinder, and means for feeding a quantity of elements into a chamber of said cylinder, said last-named means comprising a gravity feed injector registrable with the port of a subjacent chamber of said cylinder for feeding a series of elements thereinto.

2. Element dispenser apparatus as defined in claim 1, wherein said motor-operated means for receiving the elements from said exit passage comprises means for accepting and holding in position a standing magazine having the upper end positioned to receive the elements from said exit passage, a movable member therein providing a platform for receiving the lowermost of the elements, and motor means for gradually moving said member downward as the number of elements fed into the magazine increases.

3. Element dispenser apparatus as defined in claim 2, wherein said motor means is operated at the speed at which the distance through which each element falls in said magazine is maintained substantially constant.

4. Element dispenser apparatus as defined in claim 1, wherein said gravity feed injector comprises a pair of elongated, substantially parallel rails between which are inserted a series of elements to be fed downward by gravity into the port of a chamber of said cylinder.

5. Element dispenser apparatus as defined in claim 1, further including means for producing a signal in the absence of an element in the port of a chamber approaching said exit passage, and means for arresting the rotation of said cylinder in response thereto.

6. Element dispenser apparatus for sequentially feeding out elements such as electrical components, comprising a rotatable cylinder having a plurality of substantially cylindrical chambers in the periphery thereof, each parallel to the axis of said cylinder, means for rotating said cylinder about an axis having a substantial horizontal component, and fixed shell means establishing a boundary around and adjacent to said cylinder at least for substantially the lower semi-circular portion thereof, said shell boundary means presenting a concave surface in a substantially cylindrical locus adjacent the chambers of said cylinder during its revolution, said cylinder having an exit port in each of said chambers for permitting a series of elements to proceed outward toward said fixed shell means, said shell means having an exit passage and interceptor for selectively intercepting and diverting into said exit passage one of said elements from a predetermined chamber at each revolution of said cylinder.

7. Element dispenser apparatus as defined in claim 6, said interceptor comprising means for deflecting at least one element from the adjacent chamber exit port and diverting it into the exit passage of said shell boundary means and holding back from said exit passage all of the other elements of the chamber.

8. Element dispenser apparatus as defined in claim 7, wherein said interceptor comprises a pair of pointed pickoff blades for downward deflection of at least the outermost element in an exit port and upwardly restraining all other elements.

9. Element dispenser apparatus as defined in claim 6, each chamber having its exit port longitudinally extending substantially the entire axial extent thereof, baffle means being included in each chamber parallel to the axis and extending angularly inward from the port to define the inner boundary of an inward extension of the exit port through which the elements initially pass in proceeding outward from the chamber interior.

10. Element dispenser apparatus as defined in claim 6, further including element injector apparatus for feeding a quantity of elements into a chamber of said cylinder, comprising a set of guide rails defining an element feed passage leading down to the periphery of said cylinder, said set of guide rails terminating at the lower end in a passage registrable with the port of a chamber in said cylinder for charging the chamber with a quantity of the elements to be dispensed therefrom.

11. Element dispenser apparatus as defined in claim 10, wherein said set of guide rails is configured to receive and guide generally downward into a chamber a series of electrical components of configuration substantially equal to the configuration of resistors each having a cylindrical body and a pair of lead wires extending substantially axially in opposite directions from said body, said set of guide rails including, along at least part of the length thereof, means defining a downward passage substantially conformal to the diameter and length of the body of one of said components in a horizontal position.

12. Element dispenser apparatus as defined in claim 10, wherein said set of guide rails is configured to receive and guide generally downward into a chamber a series of electrical components of configuration substantially equal to the configuration of resistors each having a cylindrical body and a pair of lead wires extending substantially axially in opposite directions from said body, said set of guide rails including, along at least part of the length thereof, means defining a downward passage guiding said components by their lead wires, the downward passage in this part of the length of the set of guide rails including a transverse dimension of the passage appreciably greater than the body diameter of the components, to permit components to be released therein from a grip strip or body tape.

13. Sequencing element dispenser apparatus comprising a rotatable cylinder having a plurality of chambers in the periphery thereof, means for rotating said cylinder about a substantially horizontal axis, and a fixed cylindrical shell bounding at least the lower half of said cylinder, each of said chambers having a longitudinal exit port for permitting a series of elements to be fed outward toward said shell, said shell having an exit passage and pickoff means for diverting the outermost component from a chamber into said exit passage and retaining the other elements in the chamber as the chamber passes adjacent the exit passage during rotation of the cylinder.

14. Sequencing dispenser apparatus as defined in claim 13, wherein a plurality of the chambers and their exit ports are conformal to electrical components each having a cylindrical body and a pair of lead wires extending substantially axially in opposite directions from said body, the exit port of each chamber extending longitudinally thereof and lying between a component deflector projection extending slightly inward and a baffle plate extending angularly inward over the exit port, spaced from said component deflector projection to restrict components passing therebetween to single-file progression to and through the port.

15. Sequencing element dispenser apparatus as defined in claim 13, the number of chambers in said cylinder being the product of several integral factors, to facilitate loading the cylinder for a plurality of discharges of a predetermined sequence in each revolution of the cylinder.

16. Element dispenser apparatus comprising a rotatable cylinder having a plurality of chambers, means including a drive motor for rotating said cylinder about an axis having a substantial horizontal component, fixed shell means establishing a boundary around and adjacent to said cylinder at least for substantially the lower half thereof, said shell means presenting a concave surface in a substantially cylindrical locus adjacent chambers of said cylinder during its revolution, said cylinder having a port in each of said chambers for permitting a series of elements to proceed outward toward said fixed shell means, said shell means having an exit passage and interceptor for selectively intercepting and diverting into said exit passage one of the elements from a chamber at each revolution of said cylinder, and circuit interruptor means at a predetermined point in the path of the chambers responsive to the arrival of a chamber devoid of an element in position to be intercepted for interrupting the power supply to said drive motor and arresting the rotation of said cylinder.

17. Element dispenser apparatus as defined in claim 16, wherein said means for rotating said cylinder includes a relay holding circuit for said drive motor, and said circuit interrupter means comprises switch means connected in the relay holding circuit for interrupting the continuity thereof in response to the arrival at said switch means of a chamber without an element in position to be dispensed.

18. Element dispenser apparatus as defined in claim 17, wherein said switch means comprises a first normally closed switch arranged to be opened momentarily at the instant of passage of a chamber thereby, and a normally open switch connected in parallel with said first switch and arranged to be closed by an element in said chamber in position to be intercepted.

19. Sequencing element dispenser apparatus comprising a rotatable cylinder having a plurality of chambers in the periphery thereof, means for rotating said cylinder about a substantially horizontal axis, a fixed cylindrical shell bounding at least the lower half of said cylinder, each of said chambers having a longitudinal exit port for permitting a series of elements to be fed outward toward said shell, and means for varying the internal length of a plurality of said chambers, comprising a pair of movable end plates in each adjustable length chamber and coaxial shaft and sleeve means projecting forward from said end plates to permit adjustable positioning thereof, said shell having an exit passage pickoff means for diverting the outermost component from a chamber into said exit passage and retaining the other elements in the chamber as the chamber passes adjacent the exit passage during rotation of the cylinder.

References Cited by the Examiner

UNITED STATES PATENTS

| | | | |
|---|---|---|---|
| 913,978 | 3/1909 | Porter | 221—113 |
| 1,613,614 | 1/1927 | La Rue | 221—188 |
| 3,058,615 | 10/1962 | Pechy | 221—113 |

GERALD M. FORLENZA, *Primary Examiner.*

M. TEMIN, *Assistant Examiner.*